United States Patent [19]

Kobayashi et al.

[11] Patent Number: 5,757,447
[45] Date of Patent: May 26, 1998

[54] FLUORESCENT LAMP FOR THE COLOR LIQUID CRYSTAL DISPLAY DEVICE AND A COLOR LIQUID CRYSTAL DISPLAY DEVICE

[75] Inventors: Seishi Kobayashi, Yokohama; Akira Taya, Kawasaki; Masanobu Okano, Nara-ken, all of Japan

[73] Assignees: Toshiba Lighting & Technology Corporation, Tokyo; Sharp Kabushiki Kaisha, Osaka, both of Japan

[21] Appl. No.: 566,157

[22] Filed: Dec. 1, 1995

[30] Foreign Application Priority Data

Dec. 2, 1994 [JP] Japan .................. 6-299315

[51] Int. Cl.⁶ .................................. G02F 1/1335
[52] U.S. Cl. .................. 349/70; 349/71; 349/106; 313/487
[58] Field of Search .................. 349/70, 71, 106; 313/487

[56] References Cited

U.S. PATENT DOCUMENTS

| | | | |
|---|---|---|---|
| 4,199,707 | 4/1980 | Akiyama et al. | 313/487 |
| 4,705,986 | 11/1987 | Iwama et al. | 313/487 |
| 4,715,687 | 12/1987 | Glass et al. | 349/70 |
| 4,748,546 | 5/1988 | Ukrainsky | 349/70 |
| 4,799,050 | 1/1989 | Prince et al. | 349/71 |
| 4,940,918 | 7/1990 | Rutfield | 313/487 |

Primary Examiner—William L. Sikes
Assistant Examiner—Julie Ngo
Attorney, Agent, or Firm—Oblon, Spivak, McClelland, Maier & Neustadt, P.C.

[57] ABSTRACT

A fluorescent lamp and a color liquid crystal display device, into which the fluorescent lamp is incorporated, use three-wavelength light emitting phosphors not to cause any interference fringe so as to eliminate color shadings from the display screen of said device. A phosphor film consisting of a combination of the phosphors having their peak light emitting wavelengths at red, green and blue three-wavelength areas or ranges is formed on inner faces of a bulb of said fluorescent lamp, a half value width at the peak light emitting wavelength of each phosphor i set to be in a range of 30 nm–100 nm, and a phosphor defined by a general formula $M_3(PO_4)_2$:Sn, Mn (wherein M is at least one of Sr, Mg, Ba, Ca, Zn and Ga) is used as the red light emitting one. Fringes caused by the interference of light penetrating each optical component of the color liquid crystal display device with light reflected by front or boundary faces of these optical components can be thus prevented.

5 Claims, 4 Drawing Sheets

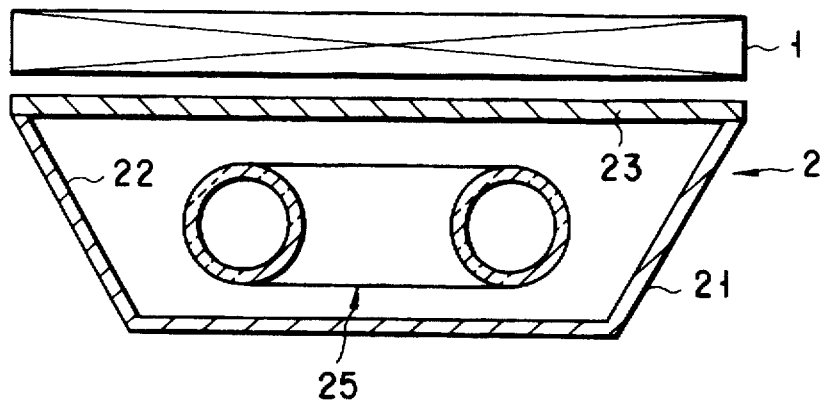
F I G. 4
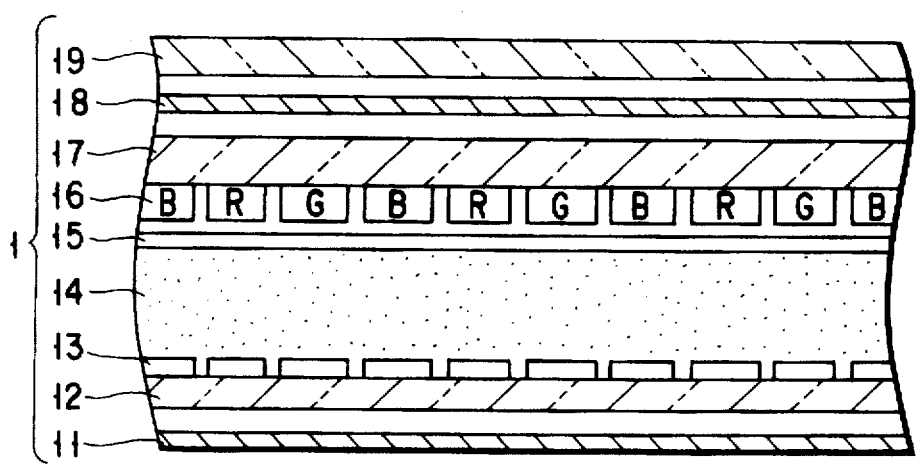
F I G. 5

FLUORESCENT LAMP FOR THE COLOR LIQUID CRYSTAL DISPLAY DEVICE AND A COLOR LIQUID CRYSTAL DISPLAY DEVICE

BACKGROUND OF THE INVENTION

1. Field of the Invention

The present invention relates to a fluorescent lamp suitable for use as a light source in the color liquid crystal display device and a color liquid crystal display device into which the fluorescent lamp is incorporated.

More particularly, it relates to a fluorescent lamp suitable for use as a light source in the color liquid crystal display device capable of improving color, luminance and other shadings of interference fringes caused by the interference of light shot from the liquid crystal display unit. It also relates to a color liquid crystal display device into which the fluorescent lamp is incorporated.

2. Description of the Related Art

The color liquid crystal display device (LCD) has been used as a display device for computers, image appliances, meters and other electronic appliances. Its use range has become wider and wider and as it becomes so, demands for its abilities have become more severe.

Those abilities of the color liquid crystal display device which have been demanded are various. Some of them are to have a higher luminance, to have a higher color rendering property, to more faithfully reproduce colors and to keep color and luminance shadings lower.

Generally, the color liquid crystal display device comprises a liquid crystal display unit and a backlight unit arranged behind the liquid crystal display unit. It is intended to shoot light from the backlight unit to the back of the liquid crystal display unit, to penetrate it through a liquid crystal image displayed on a liquid crystal layer of the liquid crystal display unit while radiating it on the liquid crystal image, and to color the penetrated light by color filters. The liquid crystal image can be thus displayed in colors. The liquid crystal display unit is well-known, which comprises a polarizing plate, glass plates, the liquid crystal layer, the color filter layer, a protection cover and others. The light shot from the backlight unit is divided into three primary colors, red, green and blue, by the color filter layer, which includes light penetrating, selectively penetrating and color controlling layers.

In order to make the luminance of the color liquid crystal display device high, the fluorescent lamp whose light-emitting range covers the whole of visible rays, that is, the white-light-emitting luminescent lamp was conventionally used as the backlight source. When white light emitted from this fluorescent lamp was divided into three primary colors as described above, however, the luminance of each color became low, thereby rendering the image on the screen of the color liquid crystal display device relatively dark.

To solve this problem, the fluorescent lamp of the three-wavelength-light emitting type is used as the backlight source. This fluorescent lamp has a strong emission spectrum at each wavelength region of three primary colors of light, red (R), green (G) and red (R) and their emission spectra strengths are large. When the fluorescent lamp of this three-wavelength-light emitting type is used as the backlight source, therefore, the color liquid crystal display device thus provided can has a high luminance of each color, a bright display screen, and a high efficiency.

However, the fluorescent lamp of the three-wavelength-light emitting type which was conventionally used as the backlight source was intended for common illumination use. Europium activated yttrium oxide $\{Y_2O_3:Eu\}$ (light-emitting peak wavelength; 611 nm, width at its half value; 5 nm) is used as red-light emitting phosphor, terbium-added activated lanthanum phosphate cerium $\{LaPO_4:Ce,Tb\}$ (light-emitting peak wavelength; 543 nm, width at its half value; 6 nm) as green-light emitting phosphor and bivalent-europium activated barium magnesium aluminate $\{BaMg_2Al_{16}O_{27}:Eu\}$ (light-emitting peak wavelength; 452 nm, width at its half value; 51 nm) as blue-light emitting phosphor. A combination of these phosphors is coated on the inner face of a bulb.

The fluorescent lamp which uses the above-described phosphors of the three-wavelength-light emitting type has such a specific energy of emission spectra as shown by a solid line in FIG. 1. In the conventional case, red having a peak wavelength of 611 nm, green having a peak wavelength of 543 nm and blue having a peak wavelength of 452 nm are more strongly emitted to satisfy the function of the three-wavelength-light emitting fluorescent lamp.

However, the three-wavelength-light emitting fluorescent lamp has a narrow width at half of each light-emitting peak wavelength value (or a narrow wavelength width at that part of the light-emitting strength which is half the light-emitting strength of a peak value of light-emitting wavelength). Namely, red having the peak wavelength at 611 nm has a wavelength width of 5 nm at half value and green having the peak wavelength at 543 nm has a wavelength width of 6 nm at half value. Blue is a composite of the emission of the blue phosphor having the peak wavelength at 452 nm and of the emission spectrum of mercury.

The three-wavelength-light emitting fluorescent lamp having a sharp emission spectrum characteristic or line spectrum like this has been developed, paying attention to the fact that our color sense reacts more strongly to relatively narrow wavelength ranges whose peaks are at 450 nm, 540 nm and 610 nm. When it is used as the common illumination lamp, therefore, it is quite effective in its light-emitting efficiency and color rendering characteristic. When it is used as the backlight source in the color liquid crystal display device, however, color shadings are caused on the display screen to thereby reduce the quality of image thus displayed on the screen.

Reasons why these color shadings appear on the display screen are supposed to be as follows. Light shot from the fluorescent lamp which serves as the backlight source penetrates the polarizing plate, each glass layer, liquid crystal, color filter and protection layers which form the liquid crystal display unit, and a part of this light is reflected by their front or boundary faces in this case. This part of light is reflected one or several times while being reciprocated between them and it interferes with that remaining part of light which has penetrated them. Low luminescent or dark areas are caused by the light which interferes while being shifted by half wavelength, and high luminescent or bright areas are caused by the light which interferes while being shifted by one wavelength. These dark and bright areas appear as those fringes which correspond to errors in widths of the unit component layers, thereby causing color shadings like fringes on the display screen and degrading the quality of images thus displayed on the screen.

These disadvantages become more remarkable when the three-wavelength-light emitting fluorescent lamp having such sharp emission or line spectrum as described above is used as the backlight.

To eliminate these disadvantages, Jpn. Pat. Appln. KOKAI Publication No. Hei 5-165028 discloses a lamp unit

3 for the color liquid crystal display device. It uses red, green and blue phosphers each having a width of about 20 nm at half the value of light-emitting strength of its peak wavelength. The spectrum range or band of each of the red, green and blue phosphors is wide in this case. Therefore, the above-mentioned fringes appear a little shifted from one another, responsive to every peak wavelength. The bright and dark fringes appearing a little shifted in this manner overlap one another to offset or average them, thereby improving or canceling color shadings on the display screen.

The above-mentioned bright and dark fringes are caused, as described above, when the light which has penetrated the unit component layers interferes with the light reflected by their front faces. That area where optical path difference between the penetrating and reflected lights is half-wavelength becomes dark while this area where it is one-wavelength becomes bright. The liquid crystal display unit has become thinner, and higher in accuracy these days. In short, each of its unit component layers is quite thin and their parallel is quite high. Therefore, the above-mentioned bright and dark fringes caused by them have a long interval between the dark and the bright. Even if the half value width of each light-emitting peak wavelength is made to be about 20 nm, therefore, these bright and dark fringes cannot be offset or averaged, thereby causing them on the display screen.

To prevent the above-mentioned fringes from being caused, it is preferable that the half value width of each of the above-mentioned peak wavelengths is made as large as possible, but when it is arranged so, the luminance of each of the three primary colors becomes low to thereby make the display screen dark, as seen in the case where the fluorescent lamp which emits white light is used as the backlight source. In addition, the wavelength width of each color becomes larger than the interference area of each color filter layer of the liquid crystal display unit, thereby lowering the light-emitting efficiency.

Further, in the case of the phospher which is used to produce the fluorescent lamp, its property such as the half value width at its peak wavelength depends upon the phospher itself. Therefore, it is usually difficult to add the above-mentioned optional half value width to the phospher. The red light emitting phospher disclosed by the above-mentioned Jpn. Pat. Appln. KOKAI Publication No. Hei 5-165028, more specifically, 3.5MgO.0.5MgF$_2$.GeO$_2$:Mn phosphor has a half value width which is almost near to 20 nm or actually in a range of 15 nm–20 nm. As long as this red light emitting phospher is used, therefore, it is impossible to set an optional half value width to the phospher.

SUMMARY OF THE INVENTION

The present invention is therefore intended to eliminate the above-mentioned drawbacks.

Accordingly, the object of the present invention is to provide a fluorescent lamp and a color liquid crystal display device into which the fluorescent lamp is incorporated, said fluorescent lamp being of the three-wavelength light emitting type having peak wavelengths responsive to three primary colors or red, green and blue, and said color liquid crystal display device being capable of enhancing the color rendering characteristic and the light-emitting efficiency and preventing luminance and color shadings from being caused.

To achieve the above-mentioned object, the fluorescent lamp according to the present invention has a phospher film which is a combination of phosphors having light-emitting peak wavelengths at red, green and blue three-wavelength ranges. The half value width of the light-emitting peak wavelength of each phospher is set to be in a range of 30 nm–100 nm and tin-manganese-added activated orthophosphate phosphor which is defined by a general formula: $M_3(PO_4)_2$:Sn,Mn (wherein M is at least one of Sr, Mg, Ba, Ca, Zn and Ga) is used as the red light-emitting phospher.

According to this fluorescent lamp, the half value width of the peak wavelength of each phospher can be set to be larger than 30 nm. Therefore, the fringes which are caused by the interference of lights can be prevented and the luminance and color shadings can also be prevented. In addition, the half value width of the peak wavelength of each phospher can be limited to smaller than 100 nm. Therefore, the half value width cannot be larger than the interference or light penetrating area of each color filter, thereby increasing the light-emitting efficiency to a greater extent.

Further, the fluorescent lamp according to the present invention uses the above-described red light emitting phospher to thereby prevent the luminance and color shadings from being caused. The above-mentioned dark and bright fringes are caused when the light which has penetrated the liquid crystal display unit interferes with the light reflected by the boundary of a unit component layer with the other one. That area of the display screen where optical path difference between the penetrated and the reflected light is half wavelength becomes dark while that area thereof where it is one wavelength becomes bright. As the wavelength of light is longer, therefore, the interval between the dark and the bright fringe becomes larger. When the half value width of the light emitting peak wavelength is made larger to offset or average the dark and bright fringes with one another, therefore, it is difficult to cancel those fringes which are caused by light or red light having a long wavelength. It is needed in this case that the half value width of the light-emitting peak wavelength is made still larger.

The above-described red light emitting phospher is novel and the half value width of its light emitting peak wavelength is large. In addition, the half value width can be changed when the blending rate of matters selected by M in the above-mentioned general formula is changed. When the half value width of the red light emitting peak wavelength, for example, is made relatively large, therefore, the dark and bright fringes of this red light can be almost fully canceled to thereby reduce the luminance and color shadings on the whole of the screen to a greater extent.

As shown in FIG. 1, the green and blue filters usually have a relatively narrow light-penetrating area, while the red filter has a light-penetrating area which spreads wide in the longer direction of wavelength. Even if the above-described red light emitting phospher is used and the half value width of its light-emitting peak wavelength is made large, therefore, the half value width cannot become larger than the light-penetrating area of this red filter, thereby no causing the light-emitting efficiency to be lowered.

According to a preferred embodiment of the present invention, at least one of manganese-added activated zinc silicate phosphor which is defined by the general formula $Zn_2SiO_4$:Mn and manganese.europium activated barium-magnesium aluminate phospher which is defined by a general formula $BaMg_2Al_{16}O_{27}$:Eu,Mn is used as the green light emitting phospher, and at least one of europium activated strontium.calcium.barium halophosphate phospher which is defined by a general formula $(Sr, Ca, Ba)_{10}(PO_4)_6Cl_2$:Eu and europium activated barium.magnesium aluminate phospher which is defined by a general formula $BaMg_2Al_{16}O_{27}$:Eu is used as the blue light-emitting phospher.

These green and blue light-emitting phosphers have relatively large half value widths of about 40 nm and 50 nm at their light-emitting peak wavelengths and their half value widths cannot become larger than the light-penetrating areas of their green and blue filters. When they are combined with the red light emitting phospher, therefore, the luminance and color shadings can be more reliably prevented, the balance of three primary colors can be made better, and the color rendering characteristic and the light-emitting efficiency can be increased to a greater extent.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 4 is a sectional view showing the color liquid crystal display device;

FIG. 5 is a sectional view showing a color liquid crystal display unit suitable for use with the color liquid crystal display device, said unit being shown dismantled;

DETAILED DESCRIPTION OF THE PREFERRED EMBODIMENTS

Figure 3:
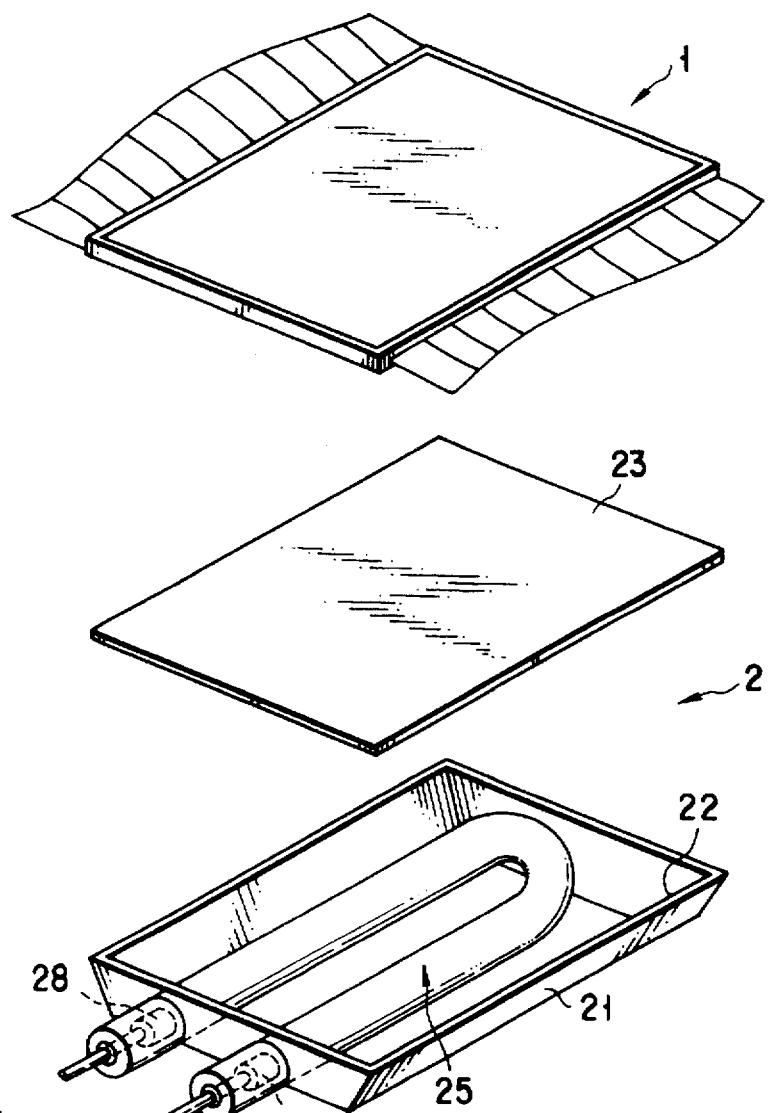
FIG. 3 is a perspective view showing a color liquid crystal display device in which the cold-cathode fluorescent lamp is used as a light source, said device being shown dismantled.

The present invention will be described in detail, referring to an embodiment shown in the accompanying drawings. As seen in FIGS. 3 through 5, reference numeral 1 represents a color liquid crystal display unit and reference numeral 2 denotes a backlight unit. As shown in detail in FIG. 4, the color liquid crystal display unit 1 comprises a polarizing plate 11, a glass plate 12, a transparent electrode 13, a liquid crystal layer 14, another transparent electrode 15, a color filter 16, another glass plate 17, another polarizing plate 18 and a protection glass 19, which are piled or laminated one upon others and shaped like a panel. The arrangement of these components may be same as that of conventional ones. The present invention is applied, in this case, to the color liquid crystal display device having a display screen larger than 6 inches. Light-penetrating characteristics of the color filter 16 are same as those of the conventional one.

The backlight unit 2 comprises a lamp housing 21, a light diffusion plate 23 attached to the open top of the lamp housing 21, and a fluorescent lamp 25 housed in the lamp housing 21 and serving as a light source. Faces of the lamp housing 21 serve as reflectors 22, which reflect a part of light shot from the lamp 25 and lead it to the light diffusion plate 23. The light diffusion plate 23 allows light reflected by the reflectors 22 of the lamp housing 21 and light directly radiated from the lamp 25 to be diffused by and passed through it, in such a way that these lights thus diffused and passed can shoot all over a back of the color liquid crystal display unit 1 with uniform brightness.

The fluorescent lamp 25 which is used as the light source may be of the hot cathode type, but the one employed by this embodiment is of the cold-cathode type which is more useful in temperature and life characteristics. It may be of the column type but the one employed by this embodiment is of the U-shaped type which enables a larger flat light-emitting area to be gained.

Figure 2:
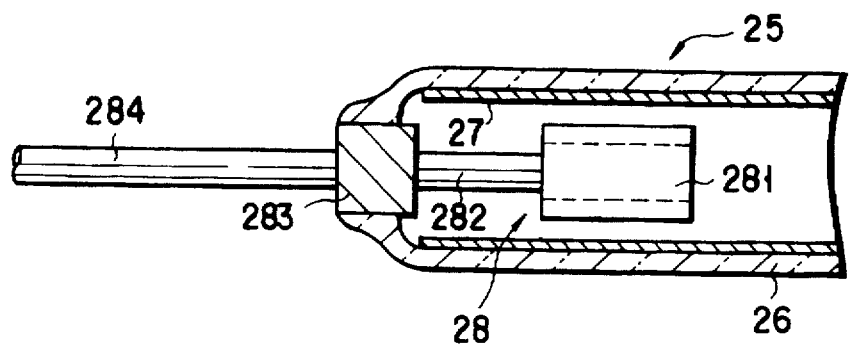
FIG. 2 is a sectional view showing one end of the cold-cathode fluorescent lamp according to an embodiment of the present invention.

As shown in FIG. 2, the U-shaped cold-cathode fluorescent lamp 25 comprises coating a phospher film 27 on the inner face of a U-shaped bulb 26 and sealing cold-cathodes 28 at both ends of the bulb 26. Each cold-cathode 28 comprises a cylindrical electrode 281 made of nickel, for example, and an inner lead line 282 connected to the electrode 281 at one end thereof. The inner lead line 282 is also connected, at the other end, to a conductive sealing member 283 made of dumet lines, for example, and sealed at the end of the bulb 26. An outer lead line 284 is connected to the conductive sealing matter 283.

A certain amount of mercury and rare gas such as argon is sealed in the bulb 26.

The phospher film 27 is formed by phosphers of the three-wavelength light emitting type which emit three primary colors of red, green and blue. The red light emitting phospher (R) has a light emitting peak wavelength which is in a range of 600–660 nm, the green light emitting phospher (G) has a light emitting peak wavelength which is in a range of 500–570 nm, and the blue light emitting phospher (B) has a light emitting peak wavelength which is in a range of 420–460 nm. Each of the three-wavelength light emitting type phosphers has a half value width at its peak wavelength (or wavelength width at that part where its light emitting strength is half the one at its peak wavelength value) which is larger than 30 nm but smaller than 100 nm.

A mixture of the red light emitting phospher whose peak wavelength is about 610 nm, the green light emitting phospher whose peak wavelength is about 525 nm, and the blue light emitting phospher whose peak wavelength is about 452 nm is actually used.

To explain in more detail, the phospher film 27 employed by this embodiment comprises the following red (R), green (G) and blue (B) light-emitting phosphers.

The red (R) light emitting phospher is tin-manganese-added activated strontium, barium, calcium, zinc, potassium orthophosphate which is defined by the general formula $M_3(PO_4)_2$:Sn, Mn (wherein M is at least one of Sr, Mg, Ba, Ca, Zn and Ga), (its light emitting peak wavelength: 610 nm, its half value width: 90 nm);

The green (G) light emitting phospher is one or a mixture of bivalent manganese-added zinc silicate which is defined by the general formula $Zn_2SiO_4$:Mn, (its light emitting peak wavelength: 525 nm, its half value width: 40 nm), and bivalent-manganese- and bivalent-europium activated barium.magnesium aluminate which is defined by the general formula $BaMg_2Al_{16}O_{27}$:Eu, Mn, (its light emitting peak wavelength: 450 nm, its half value width: 40 nm); and The blue (B) light emitting phospher is one or a mixture of bivalent europium activated strontium.calcium.barium halophosphate which is defined by the general formula $(Sr, Ca, Ba)_{10}(PO_4)_6Cl_2$:Eu, (its light emitting peak wavelength: 452 nm, its half value width: 42 nm), and bivalent europium activated barium.magnesium aluminate which is defined by the general formula $BaMg_2Al_{16}O_{27}$:Eu, (its light emitting peak wavelength: 452 nm, its half value width: 50 nm).

Figure 6:
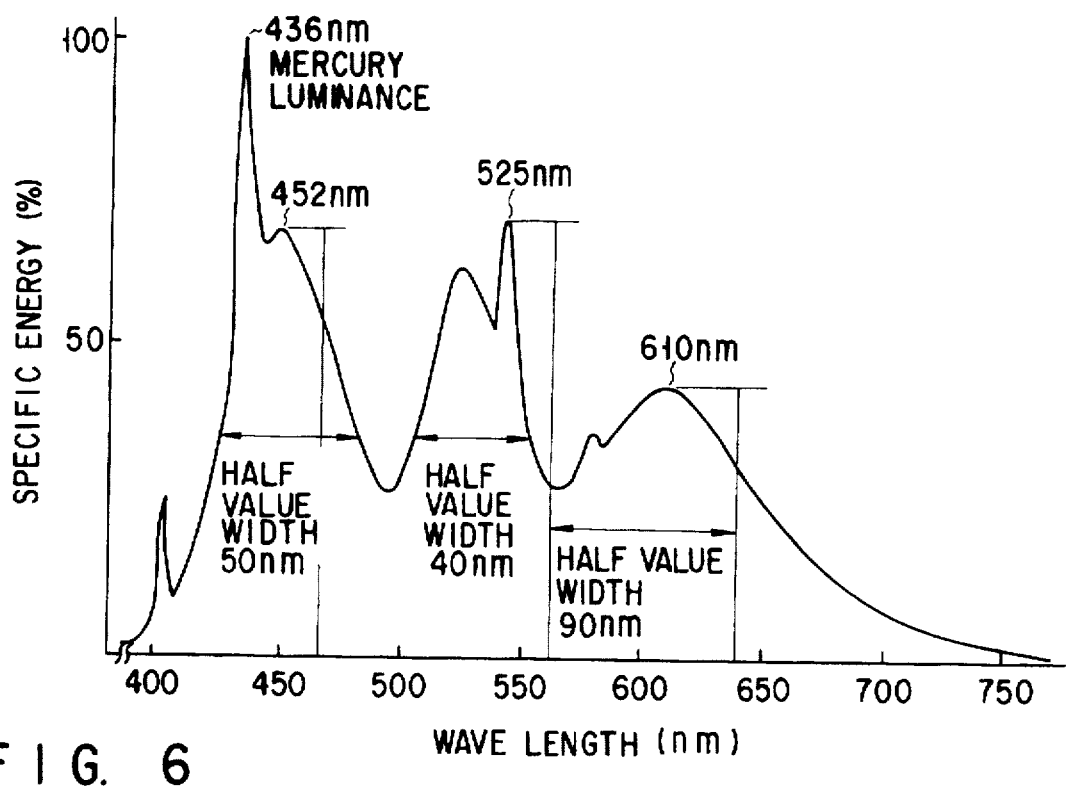
FIG. 6 is a diagram showing a curve representing spectral energy distribution characteristics of the fluorescent lamp.

The cold-cathode fluorescent lamp 25 thus formed has such spectral energy distribution characteristics as shown in FIG. 6, when it is turned on.

Figure 1:
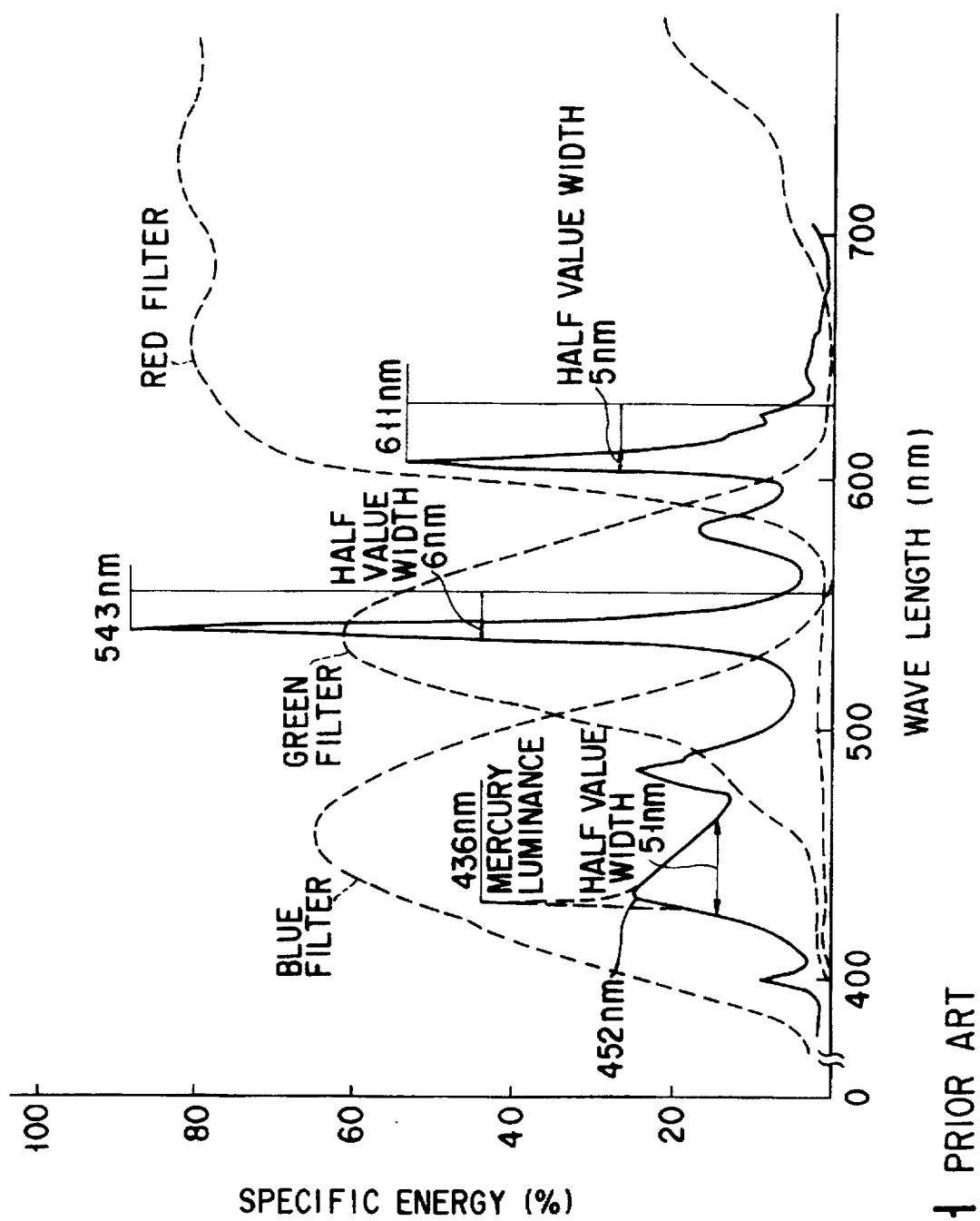
FIG. 1 shows curves representing light-emitting characteristics of the conventional fluorescent lamp and light-penetrating characteristics of color filters.

In the case of the above-described phosphers, the half value width of the red light emitting phospher which has it speak light emitting wavelength at 610 nm is 90 nm, that of the green light emitting phospher which has its peak light emitting wavelength at 525 nm is 40 nm, and that of the blue light emitting phospher which has its peak light emitting wavelength at 452 nm is 50 nm, and their half value widths are by far larger, as compared with those of the conventional phosphers shown in FIG. 1.

When this lamp 25 is incorporated into the lamp housing 21, as shown in FIGS. 3 and 4, and then turned on, a part of light shot from the lamp 25 is reflected by reflectors 22 of the lamp housing 21 and lead to the light diffusion plate 23, by which it is diffused together with light directly radiated from the lamp 25 to the light diffusion plate 23. Diffused light which has penetrated the light diffusion plate 23 is shot to the back of the color liquid crystal display unit 1 with uniform brightness. The light thus shot to the back of the color liquid crystal display unit 1 passes through polarizing plates 11, 18, glass plates 12, 17, 19, the liquid crystal layer 14 and the color filter 16 which are components of the unit 1. The arrangement of liquid crystals is controlled, in this case, by voltage added between transparent electrodes 13 and 15, so that light which is passing through the liquid crystals can be controlled to produce an image. The light which has passed through the image is colored and controlled by the color filter 16 to thereby display a color image.

In the case of the above-described cold-cathode fluorescent lamp 25, the half value width of the red light emitting phospher which has its peak wavelength at 610 nm is 90 nm, that of the green light emitting phospher which has its peak wavelength at 525 nm is 40 nm, and that of the blue light emitting phospher which has its peak wavelength at 452 nm is 50 nm. They are quite larger, as compared with those of the conventional phosphers shown in FIG. 1. Color shadings can be thus eliminated from the liquid crystal display screen.

Even if dark and bright fringes are caused by the interference of lights passing through the liquid crystal display unit 1, they are differently positioned every wavelength and thus overlapped one another when the color range of each spectrum is wide. Therefore, they can be offset or averaged as if they were not caused. As the result, luminance and color shadings can be eliminated from the display screen to thereby enhance the quality of images thus displayed.

Even if the flatness of front and boundary faces of those layers which form the liquid crystal display unit 1 and the parallel of the layers are lowered and the thickness of each layer becomes uneven, interference fringes and color shadings can be prevented from appearing on the display screen because the color range is so wide as described above. When the liquid crystal display unit is being made, therefore, it is not needed that the accuracy of each layer is kept higher than needed. This enable the management of manufacturing processes and layer accuracy to be made easier.

The above-mentioned characteristics become more remarkable particularly when the display screen is larger than 6 inches. In the case of this large-sized liquid crystal display unit, the thickness of liquid crystal and filter layers which form the unit 1 is likely to become uneven and the above-described interference fringes are likely to be thus caused. When the fluorescent lamp 25 according to the present invention is used as the light source in the color liquid crystal display device whose screen is larger than 6 inches, however, color shadings can be prevented even if the thickness of each layer is uneven.

Even if the half value width at each peak wavelength is made so large as described, its largest is set to be 100 nm. Therefore, the phosphers of the three-wavelength light emitting type can have their peak light-emitting wavelengths at red, green and blue areas to thereby keep the luminance and the light emitting efficiency higher, so that the display screen can be made brighter.

When each half value width becomes larger than 100 nm, the peak light emitting wavelength area becomes too wide. As seen in the case of white light, therefore, the light emitting strength is lowered together with the luminance, thereby making the screen dark. It is thus needed that each half value width is set to be smaller than 100 nm.

Further, when each half value width becomes larger than 100 nm, the following problems are caused. In FIG. 1 showing conventional spectral energy distribution characteristics, characteristics shown by broken lines represent interference-capable or light penetrating areas or ranges of the color filter 16 which is a component of the liquid crystal display unit 1. It is needed that light emitted from the fluorescent lamp 25 and having three-wavelength areas is present at interference areas of red, green and blue filters, respectively. When it is not present there, unnecessary luminescent colors are radiated while coming out of there. The light penetrating efficiency is thus lowered and the quantity of light is also reduced. When it is present there, however, the light penetrating efficiency can be increased to a greater extent and the quantity of light can also be made larger.

It is therefore needed that light emitted and having three-wavelength areas is made present at interference areas of red, green and blue filters.

Figure 7:
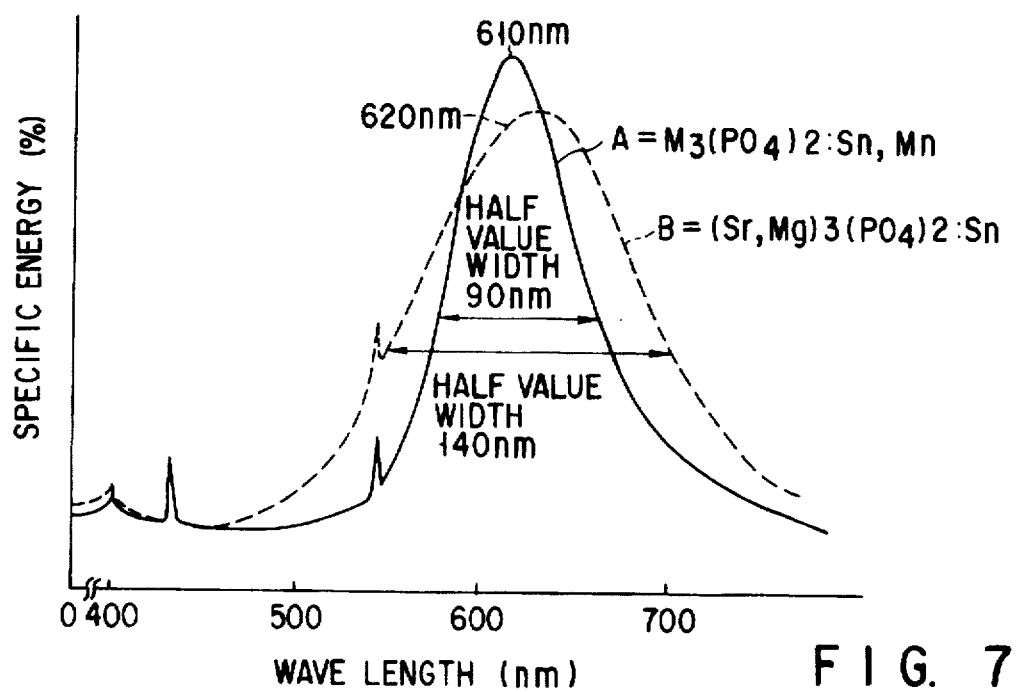
FIG. 7 is a diagram showing curves representing spectral energy distribution characteristics of red phosphers.

When the spectral energy distribution of the red light emitting phospher was measured, characteristics shown in FIG. 7 were gained. In FIG. 7, a characteristic A is gained by tin-maganese-added activated strontium, magnesium, barium, calcium, zinc, garium orthophosphate phospher (peak light emitting wavelength: 610 nm, half value width: 90 nm) which is defined by the general formula $M_3(PO_4)_2$:Sn, Mn (wherein M is at least one of Sr, Mg, Ba, Ca, Zn and Ga).

Characteristic B is gained by the other phospher of the same red light emitting type, or by tin-added activated strontium, magnesium orthophosphate phospher (peak light emitting wavelength: 620 nm, half value width: 140 nm) which is defined by the general formula $(Sr, Mg)_3(PO_4)_2$:Sn.

The red light emitting phospher according to the present invention and represented by the characteristic A has the half value width of 90 nm. Therefore, its light cannot come out of the interference area of the red filter, as shown by the spectral energy distribution in FIG. 6, to thereby increase the light penetrating efficiency and the quantity of light. However, the other phospher represented by the characteristic B is of the red light emitting type but it has the half value width of 140 nm. Therefore, its light emitted comes out of light penetrating area of the red filter to thereby lower the light penetrating efficiency and reduce the quantity of light. Further, in the case of the other red light emitting phospher including light having a long wavelength like this, its wavelength area spreads up to the upper limit of our visible range. This also lowers the light penetrating efficiency, makes its balance with the other green and blue phosphers worse, and lowers the color rendering characteristic.

Therefore, the phospher defined by the general formula $M_3(PO_4)_2$:Sn, Mn (wherein M is at least one of Sr, Mg, Ba, Ca, Zn and Ga) is better.

In addition, this red light emitting phospher can be more easily treated and it is more practical. Further, its half value width can be optionally changed in a range of 30–100 nm by selecting the mixing rate of Sn and Mn. When its half value width is optionally changed, depending upon various conditions such as the purpose of the color liquid crystal display device used, kinds of the other green and blue phosphers or characteristics of the color filter, the best light penetrating efficiency and color rendering property can be more easily attained.

According to the color liquid crystal display device in which the above-described fluorescent lamp 25 is used as the backlight source, the occurrence of interference fringes can be prevented and color shadings caused on the display screen can also be prevented. Particularly when it is applied to the color liquid crystal display device provided with a screen larger than 6 inches, interference fringes caused by the uneven thickness of each component layer of the liquid crystal display unit can be prevented.

It should be understood that the present invention is not limited to the above-described embodiment. Although the embodiment of the present invention has been described citing the case where the cold-cathode fluorescent lamp is used as the backlight source, the hot cathode fluorescent lamp may be used instead.

Further, other fluorescent lamps curved like W, for example, may be used instead of the U-shaped one. Or it may be of the column-shaped type.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A fluorescent lamp for use with the color liquid crystal display device comprising a bulb provided with electrodes sealingly arranged at both ends thereof and containing mercury and rare gas sealed therein; and a phospher film formed on inner faces of the bulb and consisting of a combination of phosphers having their peak light emitting wavelengths at red, green and blue three-wavelength areas;

wherein a half value width at the peak light emitting wavelength of each phospher is set to be in a range of 30 nm–100 nm, and tin-manganese-added activated orthophosphate phospher defined by a general formula $M_3(PO_4)_2$:Sn, Mn (wherein M is at least one of Sr, Mg, Ba, Ca, Zn and Ga) is used as a red light emitting one.

2. The fluorescent lamp according to claim 1, wherein at least one of manganese-added activated zinc silicate phospher defined by a general formula $Zn_2SiO_4$:Mn and manganese-europium activated barium.magnesium aluminate phospher defined by a general formula $BaMg_2Al_{16}O_{27}$:Eu, Mn is used as a green light emitting one and wherein at least one of europium activated strontium.calcium.barium halophosphate defined by a general formula $(Sr, Ca, Ba)_{10}(PO_4)_6Cl_2$:Eu and europium activated barium.magnesium aluminate phospher defined by a general formula $BaMg_2Al_{16}O_{27}$:Eu is used as a blue light emitting one.

3. The fluorescent lamp according to claim 1, wherein the light emitting peak of said blue light emitting phospher is in a range larger than 420 nm but smaller than 460 nm, that of said green light emitting phospher is in a range larger than 500 nm but smaller than 570 nm, and that of said red light emitting phospher is in a range larger than 600 nm but smaller than 660 nm.

4. A color liquid crystal display device in which a fluorescent lamp is arranged behind a color liquid crystal display unit and used as a backlight source, said fluorescent lamp comprising a bulb provided with electrodes sealingly arranged at both ends thereof and containing mercury and rare gas sealed therein; and a phospher film formed on inner faces of the bulb and consisting of a combination of phosphers having their peak light emitting wavelengths at red, green and blue three-wavelength areas;

wherein a half value width at the peak light emitting wavelength of each phospher is set to be in a range of 30 nm–100 nm and tin-manganese-added activated orthophosphate phospher defined by the general formula $M_3(PO_4)_2$:Sn, Mn (wherein M is at least one of Sr, Mg, Ba, Ca, Zn and Ga is used as the red light emitting one.

5. The color liquid crystal display device according to claim 4, wherein the screen of said color liquid crystal display unit has a size larger than 6 inches.

* * * * *